United States Patent [19]
Fontaine

[11] Patent Number: 6,142,715
[45] Date of Patent: Nov. 7, 2000

[54] FILE ADAPTER FOR POWER SAW TOOL

[75] Inventor: Robert R. Fontaine, Santa Clarita, Calif.

[73] Assignee: Filezall, Inc., Los Angeles, Calif.

[21] Appl. No.: 09/294,733

[22] Filed: Apr. 19, 1999

[51] Int. Cl.[7] .................................................. B23D 71/00
[52] U.S. Cl. .................. 407/29.1; 407/29.11; 407/29.14; 407/29.15
[58] Field of Search .............................. 407/29.1, 29.11, 407/29.12, 29.14, 29.15

[56] References Cited

U.S. PATENT DOCUMENTS

| | | | |
|---|---|---|---|
| 79,709 | 7/1868 | Weare | 407/29.15 |
| 2,962,798 | 12/1960 | Gaskins | 407/29.15 X |
| 5,097,578 | 3/1992 | Jandl | 407/29.1 |

*Primary Examiner*—Henry W. H. Tsai
*Attorney, Agent, or Firm*—Christie, Parker & Hale, LLP

[57] ABSTRACT

A motor driven power hand tool and adapter reciprocating a modified hand file in pressured engagement with a work piece by manipulating a lever resistance intermediate the opposite ends of a file which becomes a second class lever operating with a fulcrum at its reciprocally driven end and with work force applied at its other end, the invention residing in the adapter that guides the file as an aftermarket device and in combination with the power hand tool.

15 Claims, 2 Drawing Sheets

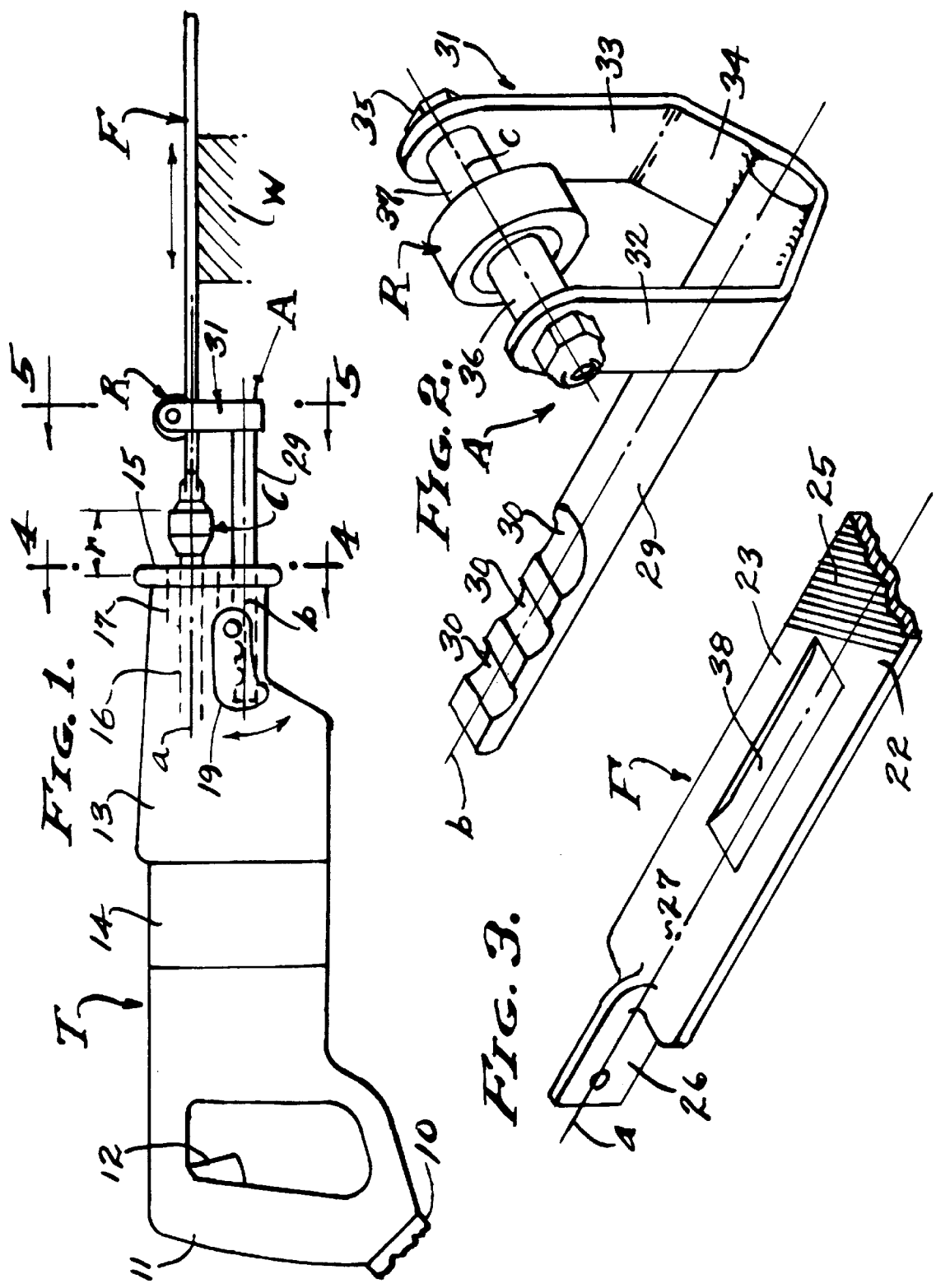

FILE ADAPTER FOR POWER SAW TOOL

BACKGROUND OF THE INVENTION

This invention relates to hand operated power tools of the type for reciprocating saw blades and the like. Such tools are electrically operated and characterized by a driving head that reciprocates a ram rod to which a saw blade or the like is attached as by means of a set screw or chuck. A feature of these power saw tools is a shoe that slidably engages and limits the penetration of the saw blade into said work. A heavy duty power saw tool of the type under consideration is shown in FIG. 1 of the drawings herein, with the aforesaid guide shoe removed and replaced by the file adapter of the present invention. Also, a common hand file (modified) replaces a saw blade for which this particular power tool is designed.

Heretofore, slender elongated saw blades of thin cross section (0.040" to 0.050"), and sander attachments, have been operated by such power tools, so as to reciprocate against and through work pieces, and various guide mechanisms have been associated with the controlling shoe to back up the saw blade as it is pressed against said work piece. And a characteristic of these power saw tools is the relatively short stroke of the saw blade which too is relatively short and not lengthy as a hand saw would be. In other words, the power tools of the prior art have not been conducive to the adaption thereto of lengthy hand files.

It is the common hand file with which this invention is particularly concerned, and it is to be understood that there are various special files to which the adapter system of the present invention is to be applied. The files with which this invention is concerned are elongated bars with a surface upon which teeth are formed to engage and cut material from a work piece. The cross sectional configuration of said bars varies in order to present a toothed surface, and the coarseness and number of teeth is as circumstances require. For example, files can be flat, round, half-round, triangular or rectangular, and the tooth configuration coarse cut, bastard cut, single cut, double cut etc. There are also rasp files with an arrangement of round cupped teeth. It is to be understood therefore that this invention relates to all files, a characteristic of which is a body of hardened steel having a base end with an annealed tang of tapered configuration extending from a base end thereof. A full sized common file has an active toothed face nine inches long and seven eights inches wide, with a base and tang approximately three inches long extending therefrom (these dimensions are variable). It is this common hand file with which this invention is particularly concerned, it being an object of this invention to modify such a file and thereby adapt it to a chuck of a power saw tool.

Hand filing involves manipulative skills. That is, the teeth are formed so as to cut only during a forward pushing motion during which downard pressure against the workpiece must be applied. Too little pressure especially on hard materials tends to dull the teeth quickly. And too much pressure tends to clog the teeth and break them off. Accordingly, pressure against the workpiece must be applied in order to render a file effective, and it is to this end that it is an object of this invention to provide a power saw tool adapter for applying work pressure to the back side of a file chucked in said tool. In accordance with this invention, said work pressure is applied to the base-tang end portion of the file, said work pressure being shared by the chuck and ram-rod of the power tool.

In the coarse of rough shaping a work piece with the power saw tool file adapter herein disclosed, lateral pressures are applied to the file that is anchored to the reciprocating chuck of the tool. In practice, the active toothed portion of the file extends four or five times its base length forming a lever arm that could be destructive of the coupled attachment of the file to the tool chuck. Therefore, it is an object of this invention to eliminate bending stress from the file to chuck connection, by means of a fixedly positioned guide roller operating as a resistance member in a guideway formed in the back side of the file base.

A feature of this invention is the file adapter that replaces the prior art shoe of power saw tools, thereby providing 1) a resistance for the application of downward work pressure, and 2) a double resistance for side to side reception to lateral work pressures; all of which prevents destructive forces from being applied to the file-to-chuck connection. Accordingly, a second class lever is involved in any situation, the chuck of the power tool being the fulcrum, the guide roller being the resistance, and the extended file being the forceful lever arm.

PRIOR ART

This file adapter system for electrical power tools is especially suited for incorporation in a "SAWZAL"tm as manufactured by Milwaukee Tool Corp. and as disclosed in U.S. Pat. No. 5,855,070 granted Jan. 5, 1999, and replaces the pivotally attached shoe thereof in order to operate a file in place of a saw. The Milwaukee '070 patent power tool features the adjustable shoe that pivotally engages the workpiece, whereas the present invention adapter does not engage the workpiece but rather engages and controls the work cutter in the form of a file. The Milwaukee '070 patent power tool is a heavy duty tool used generally in a horizontal position and manipulated into any other convenient position, and is characterized by its longitudinally disposed reciprocal axis, there being a motor and drive head intermediate a hand grip and functional working end. The work engagement shoe is essentially an attachment and there is an adjustable lock means to receive the shoe attachment at three extended positions. A feature of the Milwaukee '070 patent power tool is the two-jaw chuck for coupling the flat faced end portion of a saw blade or the like to the operational end of the reciprocating ram-rod. The ram-rod is rotatably guided so as to maintain the flat base of the saw blade in a vertical plane coincidental with said reciprocal axis. And, the saw blade cantilevers from the chuck when coupled thereto.

SUMMARY OF THE INVENTION

The file adapter herein disclosed enables a file to cantilever from the aforesaid power saw tool chuck without subjecting the coupled attachment to damaging bending stresses. It will be apparent that the file to chuck attachment is essentially a hinge and therefore bending moments are critically high. However, by restricting the file-to-chuck attachment so as to function as the fulcrum of a second class lever, bending stresses are virtually eliminated, since the function of the resistance roller herein provided prevents upward and side movement of the file at a position substantially removed from the fulcrum. In practice the fulcrum shifts approximately 2.25 inch and 3.50 inch from the resistance roller as a result of reciprocal motion. And, this provides a variable lever that is sufficient to withstand the downward and lateral operational loads that are normally applied. In carrying out this invention, the annealed base and tongue portion of the file is modified, as by forging a vertically disposed coupling plate thereof, or by integrally fastening such a plate to the base of the file. And a feature of the file modification is a roller guideway in the face thereof opposite the cutting face of the file. In practice, a small portion of the cutting face may be sacrificed to accomodate said roller guideway, at either or both sides of the file (as shown).

The file adapter employs the support and locking adjustment of the Milwaukee '070 patent power tool and provides a fixedly placed resistance roller support overlying the base portion of the file to engage in the roller guideway therein.

The foregoing and various other objects and features of this invention will be apparent and fully understood from the following detailed description of the typical preferred forms and applications thereof, throughout which description reference is made to the accompanying drawings.

THE DRAWINGS

FIG. 1 is a horizontal side view of a power saw tool modified with the file adapter of the present invention and with a modified hand file coupled to the operating ram-rod of the tool.

FIG. 2 is an enlarged detailed perspective view of the file adapter of the present invention, removed from the power tool of FIG. 1.

FIG. 3 is an enlarged fragmentary detailed view of a modified hand file for coupled engagement in the power tool chuck of FIG. 1.

Figure 5:
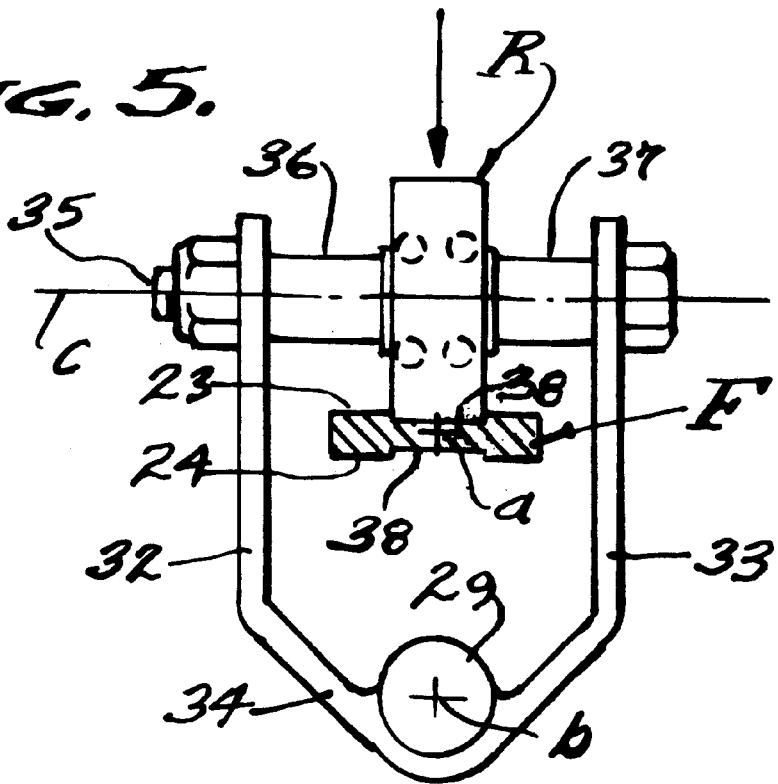

And, FIG. 5 is an enlarged detailed sectional view taken as indicated by line 5—5 on FIG. 1.

PREFERRED EMBODIMENT

Referring now to the drawings, the file adapter A herein disclosed is useful as an aftermarket attachemnt to a hand held power saw tool T as clearly illustrated in FIG. 1. However, it is to be understood that the features involved in this combination of power tool and file adapter can be a "Power File Tool" per se. And, the file file F is a modified hand file as clearly illustrated in FIG. 3, and this file can be a special file with abrasive cutting means adapted to use in said Power File Tool.

Figure 4:
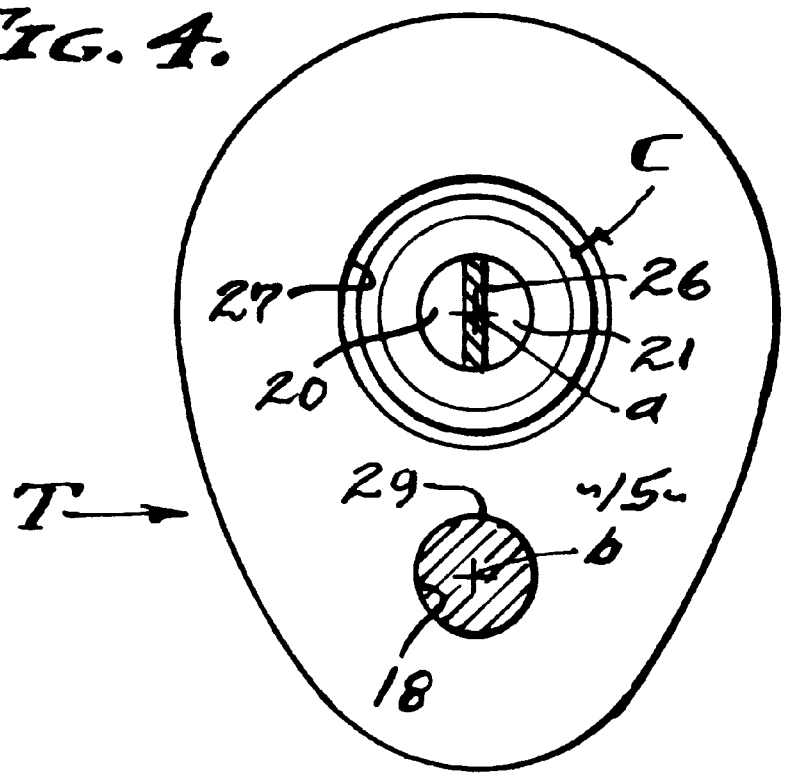
FIG. 4 is an enlarged detailed sectional view taken as indicated by line 4—4 on FIG. 1.

The power saw tool T is electrically operated through a power cord attachment 10 and hand grip 11 with a trigger switch 12 for controlled manipulation. Intermediate the hand grip 11 and a power head 13 there is an electric motor drive 14, the power head being characterized by a flat front face 15 through which a ram-rod 16 reciprocates a chuck C on a reciprocating axis a. The chuck C is shown in its extreme forward reciprocal position, and its rearward travel indicated by the dimension r. As shown in FIG. 4 there is a chuck socket 17 in the face 15, so that the chuck is received in the power head 13 when retracted (not shown). A feature of the power saw tool T is the mounting bar socket 18 in the face 15, on an axis b spaced below and parallel to the reciprocating axis a of the tool. A latch means 19 is located at one side of the power head 13 for locking the mounting bar of the file adapter in working position as shown. There is no modification of the power saw tool T, though it can be made as a power filing tool per se.

Coupling of the file F to the operating exposed end of the ram-rod 16 can vary with power tools of different manufacture. In many reciprocating power saw tools a simple pin or screw fastener passes through the flat base portion of the saw blade, the pin or screw being subjected to shear forces. However, in the advanced tool design under consideration, the chuck C grips the flat base portion of the saw blade between a pair of jaws 20 and 21, a two-jaw chuck C as shown herein. Accordingly, the opposed gripping faces of jaws 20 and 21 are perpendicularly disposed and spaced to receive a flat base of a file F as later described. The ram-rod 16 reciprocates but does not rotate on the reciprocating axis a, so that the jaw aperture of the chuck C remains perpendicular as shown. Additionally, the chuck jaws 20 and 21 can include shear pins to engage through the flat base of a file F (not shown).

Referring now to FIG. 3 and to the modified or special file configuration of the present invention, a file "blank" or body 22 of rectangular (or any other) cross section is shown wherein top and bottom faces 23 and 24 are spaced and parallel and provided with cutting teeth 25, for example a "single cut bastard" file, as shown. In accordance with this invention, there is no "tang" and in place thereof there is a coupling plate 26 integral with the base portion 27 of the file "blank" or body 22. The file "blank" or body 22 has a longitudinal axis equidistant from the faces 23 and 24 and from the opposite side edges of the file, the coupling plate 26 being centered on said axis and disposed perpendicular to the top and bottom faces 23 and 24. And, there is a shear pin opening through the coupling plate 26 coincidental with said file axis. The Coupling plate is preferably formed as by forging from the annealed "tang" or base portion of the file "blank" or body 22. Or it can be a separate member attached to the file body.

Referring now to FIG. 2 and to the file adapter A, there is a forwardly extending member and preferably a mounting bar 29 adapted to be received in the mounting bar socket 18 provided in the power saw tool face 15. The mounting bar 29 is locked in one of a plurality of adjustably extended positions by the latch means 19 engageable in a selected notch 30 spaced along the bar. In practice, the mounting bar has a flat face in which the notches are formed and engageable by the latch means to rotatably fix the mounting bar when it is positioned.

In accordance with this invention, a resistance means or roller R is fixedly positioned to downwardly pressure the extending file F coupled to the ram-rod 16 by means of the aforementioned forwardly extending member preferably in the form of a bracket 31 carried by the above described mounting bar 29. As best illustrated in FIG. 5 the bracket 31 embraces the reciprocating file F and supports the resistance roller R on a transverse axis c spaced above the top face 23 (or 24 since the file is reversible). The bracket 31 is comprised of spaced upstanding legs 32 and 33 carried by a saddle 34 welded or otherwise secured to the extended end portion of the mounting bar 29. A cap screw 35 secured by a nut extends through the legs 32 and 33, with spacer sleeves 36 and 37 fixing the inner race of a double ball bearing roller R centered over the reciprocal axis of the file F with the periphery of the resistance roller R adapted to engage with the base of the file "blank" or body 22 (see FIGS. 1 and 5). Accordingly, downard pressure can be discriminately applied at the resistance point of the second class lever with its fulcrum at the chuck C and force applied through downward pressure on the file against a workpiece W.

Referring now to FIGS. 3 and 5 and to the modified (specialized) file F, lateral forces as may be applied are accepted by a resistance means in the form of a groove or channel 38 for preventing lateral displacement of the reciprocating file F. The same second class lever function as hereinabove described applies to the lateral resistance of the resistance roller R operating between the side walls of a groove or channel 38 as shown, the resistance roller R being received in the elongated resistance groove or channel 38, with minimum side wall clearance, whereby side motion is prevented at the roller R spaced from the fulcrum of attachment at the chuck C.

By employing the file adapter A and file modification hereinabove described, the file F coupled to the reciprocating chuck C becomes a second class lever positioned by the resistance roller R and with its fulcrum at said chuck. And, the force is applied to the workpiece W by the extended arm of the file lever. It is significant that the chuck C fulcrum is essentially fixed whereas the resistance roller R is essentially movable as it is employed to manually apply downward pressure to the file F whereby the extended lever arm thereof forcibly applies the file teeth against the workpiece W. Accordingly, the coupled engagement of the file F to the chuck C is not subjected bending and is thereby protected against structural failure.

Having described only the preferred forms and applications of my invention, I do not wish to be limited or restricted to the specific details herein set forth, but wish to reserve to myself any modifications or variations that may appear to those skilled in the art as set forth within the limits of the following claims.

I claim:

1. A motor driven workpiece cutting tool with a power head reciprocating a ram-rod on a forwardly projecting axis, and including;
    an elongated file having a flat base portion with top and bottom faces and coupled to the ram-rod to be reciprocated thereby, and having an extended portion and bottom face thereof with cutting means on said bottom face,
    and a file adapter extending forwardly from a power head of the tool and positioning a resistance means for engaging and downwardly pressing the top face of the base portion of the file forwardly of its coupled engagement to the ram-rod and rearwardly of said extended portion thereof,
    the file being a second class lever with its fulcrum coupled to the ram-rod, its resistance downwardly pressured at the flat base portion of the file, and with working extended portion with said cutting means for forcibly engaging a workpiece.

2. The workpiece cutting tool as set forth in claim 1, wherein the resistance means is a roller on a transverse axis spaced above said flat base portion of the file and with a periphery thereof engaging and downwardly pressuring said base portion of the file.

3. The workpiece cutting tool as set forth in claim 1, wherein the top face of the base portion of the file has a guide channel in which the resistance means is engaged both downwardly and laterally, the file being a second class lever both vertically and horizontally.

4. The workpiece cutting tool as set forth in claim 1, wherein the top face of the base portion of the file has a guide channel with a bottom and side walls, and wherein the resistance means is a roller with a periphery engaging downwardly against said bottom and with sides engaging laterally against said side walls of the channel, the file being a second class lever both vertically and horizontally.

5. The workpiece cutting tool as set forth in claim 1, wherein the file is coupled to the ram-rod by a chuck having spaced jaws forming a vertically disposed aperture, and wherein the file has a vertically disposed mounting plate perpendicular to the top and bottom faces of the base portion of the file, said mounting plate being received in said aperture and gripped by said jaws.

6. A file for coupled engagement to a ram-rod of a workpiece cutting tool with a power head reciprocating said ram-rod on a forwardly projecting axis, the file including;
    an elongate body with top and bottom faces with cutting means on at least one of said faces and having a vertically disposed mounting plate extending from a flat base of the file and perpendicular to the top and bottom faces thereof, and a fastening means opening through the mounting plate for receiving a coupling fastener to the ram-rod.

7. The file for a workpiece cutting tool as set forth in claim 6, wherein the fastening means is a shear pin.

8. The file for a workpiece cutting tool as set forth in claim 6, wherein the elongate body of the file has an axis adapted to be disposed coincidental with said projecting axis of the ram-rod, the flat base and mounting plate being centered on said axis.

9. The file for a workpiece cutting tool as set forth in claim 6, the workpiece cutting tool having a chuck carried by the ram-rod and with spaced jaws forming a vertically disposed aperture, and the mounting plate adapted to be received in said aperture and gripped by said jaws.

10. A file adapter for a motor driven workpiece cutting tool with a power head reciprocating an elongate file coupled to a ram-rod reciprocated thereby on a forwardly projecting axis, the file having a flat base portion with top and bottom faces, having an extended portion and bottom face thereof with cutting means on said bottom face, and including;
    a forwardly extending member carried by the power head of the tool and positioning a resistance means for engaging and downwardly pressuring the top face of the base portion of the file forwardly of its coupled engagement to the ram-rod and rearwardly of said extended portion thereof,
    the file being a second class lever with its fulcrum coupled to the ram-rod and its resistance downwardly pressured at the flat base portion of the file, and with a working extended portion cutting means for forcibly engaging a workpiece.

11. The file adapter for a workpiece cutting tool as set forth in claim 10, wherein the resistance means is a roller on a transverse axis spaced above said forwardly projecting axis and with a periphery thereof engaging and downwardly pressuring said base portion of the file.

12. The file adapter for a workpiece cutting tool as set forth in claim 10, wherein the face of the base portion of the file has a guide channel, the resistance means being engaged both downwardly and laterally with said guide channel, the file being located thereby both vertically and horizontally.

13. The file adapter for a workpiece cutting tool as set forth in claim 10, wherein the top face of the base portion of the file has a guide channel with a bottom and side walls, and wherein the resistance means is a roller with a periphery thereof engaging downwardly against said bottom and with sides thereof engaging laterally against said side walls of the guide channel, the file being located thereby both vertically and horizontally.

14. The file adapter for a workpiece cutting tool as set forth in claim 10, the power head of the tool having a forwardly opening socket on an axis below and parallel to the aforesaid forwardly projecting axis, and the adapter having a horizontal mounting bar adapted to be received in said socket and extending forwardly carrying the resistance means.

15. The file adapter for a workpiece cutting tool as set forth in claim 10, the power head of the tool having a forwardly opening bar mounting socket with latch means on an axis below and parallel to the aforesaid forwardly projecting axis, and the adapter having a horizontal mounting bar adapted to be received in said socket and notched for fixed engagement with said latch means and extending forwardly carrying the resistance means.

* * * * *